(12) United States Patent
Xu et al.

(10) Patent No.: US 12,449,675 B2
(45) Date of Patent: Oct. 21, 2025

(54) SUBSURFACE OPTICAL STRUCTURE WITH ENHANCED DISTRIBUTION OF REFRACTIVE INDEX VALUES

(71) Applicant: Clerio Vision, Inc., Rochester, NY (US)

(72) Inventors: Lisen J. Xu, Pittsford, NY (US); Gustavo A. Gandara-Montano, Rochester, NY (US)

(73) Assignee: Clerio Vision, Inc., Rochester, NY (US)

( * ) Notice: Subject to any disclaimer, the term of this patent is extended or adjusted under 35 U.S.C. 154(b) by 435 days.

(21) Appl. No.: 18/170,783

(22) Filed: Feb. 17, 2023

(65) Prior Publication Data

US 2023/0204978 A1 Jun. 29, 2023

Related U.S. Application Data

(63) Continuation of application No. PCT/US2021/046564, filed on Aug. 18, 2021.
(Continued)

(51) Int. Cl.
*G02C 7/04* (2006.01)
*A61F 2/16* (2006.01)
*G02C 7/02* (2006.01)

(52) U.S. Cl.
CPC ............ *G02C 7/049* (2013.01); *A61F 2/1656* (2013.01); *G02C 2202/12* (2013.01)

(58) Field of Classification Search
None
See application file for complete search history.

(56) References Cited

U.S. PATENT DOCUMENTS 7,789,910 B2  9/2010  Knox et al.
8,079,702 B2 * 12/2011  Ballet ............... G02C 7/102
                                              351/178
(Continued)

FOREIGN PATENT DOCUMENTS

EP    3179294 A1    6/2017
WO  2008002796 A2   1/2008
(Continued)

OTHER PUBLICATIONS

Flitcroft et al., "IMI—Defining and Classifying Myopia: A Proposed Set of Standards for Clinical and Epidemiologic Studies", Investigative Ophthalmology & Visual Science, vol. 60, No. 3, Feb. 2019, pp. M20-M30.
(Continued)

*Primary Examiner* — Darryl J Collins
(74) *Attorney, Agent, or Firm* — Kilpatrick Townsend & Stockton LLP

(57) ABSTRACT

Ophthalmic lenses and related methods employ subsurface optical structures with enhanced refractive index distributions. An ophthalmic lens includes a lens body and a subsurface optical structure within the lens body. Subvolumes of the optical structure have refractive indexes that vary spatially between a first limit refractive index for the optical structure and a second limit refractive index for the optical structure. The refractive indexes are equal to the first limit refractive index for the optical structure over a first section of the optical structure. The refractive indexes are equal to the second limit refractive index for the optical structure over a second section of the optical structure.

19 Claims, 9 Drawing Sheets

Related U.S. Application Data

(60) Provisional application No. 63/069,943, filed on Aug. 25, 2020.

(56) References Cited

U.S. PATENT DOCUMENTS

| | | | |
|---|---|---|---|
| 8,134,782 B2 * | 3/2012 | Archambeau | G02B 1/06 351/159.01 |
| 8,337,553 B2 | 12/2012 | Knox et al. | |
| 8,512,320 B1 | 8/2013 | Knox et al. | |
| 8,617,147 B2 | 12/2013 | Knox et al. | |
| 8,901,190 B2 | 12/2014 | Smith et al. | |
| 8,932,352 B2 | 1/2015 | Knox et al. | |
| 9,060,847 B2 | 6/2015 | Smith et al. | |
| 9,144,491 B2 | 9/2015 | Knox et al. | |
| 9,492,323 B2 | 11/2016 | Knox et al. | |
| 9,545,340 B1 | 1/2017 | Knox et al. | |
| 9,622,912 B2 | 4/2017 | Knox et al. | |
| 9,939,558 B2 | 4/2018 | Knox et al. | |
| 10,226,381 B2 | 3/2019 | Knox et al. | |
| 10,845,619 B2 * | 11/2020 | Mappes | B29D 11/00028 |
| 2008/0001320 A1 | 1/2008 | Knox et al. | |
| 2009/0046349 A1 | 2/2009 | Haddock et al. | |
| 2012/0310223 A1 | 12/2012 | Knox et al. | |
| 2013/0178934 A1 | 7/2013 | Knox et al. | |
| 2013/0226162 A1 | 8/2013 | Knox et al. | |
| 2013/0314665 A1 | 11/2013 | Tung | |
| 2016/0144580 A1 | 5/2016 | Knox et al. | |
| 2017/0035613 A1 | 2/2017 | Knox et al. | |
| 2017/0146820 A1 | 5/2017 | Brennan et al. | |
| 2017/0181846 A1 | 6/2017 | Knox et al. | |
| 2018/0021172 A1 | 1/2018 | Zheleznyak et al. | |
| 2018/0206979 A1 | 7/2018 | Knox et al. | |
| 2018/0231696 A1 | 8/2018 | Knox et al. | |
| 2018/0243082 A1 | 8/2018 | Zheleznyak et al. | |
| 2018/0373060 A1 | 12/2018 | Knox et al. | |
| 2019/0046357 A1 | 2/2019 | Knox et al. | |
| 2019/0343683 A1 | 11/2019 | Zheleznyak et al. | |
| 2020/0054485 A1 | 2/2020 | Knox | |
| 2021/0018762 A1 | 1/2021 | Zheleznyak | |

FOREIGN PATENT DOCUMENTS

| | | |
|---|---|---|
| WO | 2009143054 A2 | 11/2009 |
| WO | 2012166696 A1 | 12/2012 |
| WO | 2015006274 A1 | 1/2015 |
| WO | 2017106321 A1 | 6/2017 |
| WO | 2018182946 A1 | 10/2018 |
| WO | 2019010345 A1 | 1/2019 |
| WO | 2019147952 A1 | 8/2019 |
| WO | 2020102514 A1 | 5/2020 |
| WO | 2021108585 A1 | 6/2021 |

OTHER PUBLICATIONS

Gandara-Montano, "Advances in Deterministic Femtosecond Laser Writing of Vision Correction Devices in Ophthalmic Hydrogels", Thesis—The Institute of Optics Arts, Sciences and Engineering; Edmund A. Hajim School of Engineering and Applied Sciences; University of Rochester, Rochester, New York, 2019, 378 pages.

Gandara-Montano et al., "Optical Quality of Hydrogel Ophthalmic Devices Created with Femtosecond Laser Induced Refractive Index Modification", Optical Materials Express, vol. 8, No. 2, Feb. 1, 2018, pp. 295-313.

Hiraoka et al., "Relationships between higher-order wavefront aberrations and natural progression of myopia in schoolchildren", 2017, 9 Pages.

Huang et al., "Efficacy Comparison of 16 Interventions for Myopia Control in Children", America Academy of Ophthalmology, vol. 123, No. 4, Apr. 2016, pp. 697-708.

Li et al., "Studies Using Concentric Ring Bifocal and Peripheral Add Multifocal Contact Lenses to Slow Myopia Progression in School-Aged Children: A Meta-Analysis", Ophthalmic & Physiological Optics, vol. 37, No. 1, Jan. 2017, pp. 51-59.

Moreno et al., "Modulation Light Efficiency of Diffractive Lenses Displayed in a Restricted Phase-Mostly Modulation Display", Applied Optics, vol. 43, No. 34, Dec. 1, 2004, pp. 6278-6284.

Resnikoff et al., "Myopia—A 21st Century Public Health Issue", Investigative Ophthalmology & Visual Science, vol. 60, No. 3, Feb. 2019, pp. Mi-Mii.

Savage et al., "First Demonstration of Ocular Refractive Change Using Blue-IRIS in Live Cats", Investigative Ophthalmology & Visual Science, vol. 55, No. 7, Jul. 1, 2014, pp. 4603-4612.

Si et al., "Orthokeratology for Myopia Control: A Meta-Analysis", Optometry and Vision Science, vol. 92, No. 3, Mar. 2015, pp. 252-257.

Smith et al., "Peripheral vision can influence eye growth and refractive development in infant monkeys", Nov. 2017, 16 Pages.

Tedja et al., "IMI—Myopia Genetics Report", Investigative Ophthalmology & Visual Science, vol. 60, No. 3, Feb. 2019, pp. M89-M105.

Troilo et al., "IMI—Report on Experimental Models of Emmetropization And Myopia", Investigative Ophthalmology & Visual Science, vol. 60, No. 3, Feb. 2019, pp. M31-M88.

Wildsoet et al., "IMI—Interventions for Controlling Myopia Onset and Progression Report", Investigative Ophthalmology & Visual Science, vol. 60, No. 3, Feb. 2019, pp. M106-M131.

Wolffsohn et al., "IMI—Clinical Myopia Control Trials and Instrumentation Report", Investigative Ophthalmology & Visual Science, vol. 60, No. 3, Feb. 2019, pp. M132-M160.

Wolffsohn et al., "IMI—Myopia Control Reports Overview and Introduction", Investigative Ophthalmology & Visual Science, vol. 60, No. 3, Feb. 2019, pp. M1-M19.

Xu, "Femtosecond Laser Processing of Ophthalmic Materials and Ocular Tissues: A Novel Approach for Non-invasive Vision Correction", Thesis—The Institute of Optics Arts, Science and Engineering, Edmund A. Hajim School of Engineering and Applied Sciences; University of Rochester, Rochester, New York, 2013, 344 pages.

Xu et al., "Noninvasive Intratissue Refractive Index Shaping (IRIS) of the Cornea with Blue Femtosecond Laser Light", Investigative Ophthalmology & Visual Science, vol. 52, No. 11, Oct. 17, 2011, pp. 8148-8155.

Xu and Knox, "Lateral gradient index microlenses written in ophthalmic hydrogel polymers by femtosecond laser micromachining", Optical Materials Express 1416, vol. 1, No. 8, 2011, 9 pages.

* cited by examiner

+1 order MTF for lens with add power of +2 D and $\Phi_{max} = \lambda/3$

Through-focus MTF at 30 lp/° for lens with add power of +2 D and $\Phi_{max} = \lambda/3$ +1 order MTF for lens with
add power of +2 D and $\Phi_{max} = \lambda/4$ Through-focus MTF at 30 lp/° for lens with
add power of +2 D and $\Phi_{max} = \lambda/4$ +1 order MTF for lens with add power of +2 D and $\Phi_{max} = \lambda/6$ Through-focus MTF at 30 lp/° for lens with add power of +2 D and $\Phi_{max} = \lambda/6$

SUBSURFACE OPTICAL STRUCTURE WITH ENHANCED DISTRIBUTION OF REFRACTIVE INDEX VALUES

CROSS REFERENCES TO RELATED APPLICATIONS

The present application is a Continuation of PCT/US2021/046564 filed Aug. 18, 2021; which claims priority to U.S. Provisional Patent Appln No. 63/069,943 filed Aug. 25, 2020, the full disclosures which are incorporated herein by reference in their entirety for all purposes.

BACKGROUND

Optical aberrations that degrade visual acuity are common. Optical aberrations are imperfections of the eye that degrade the focusing of light onto the retina. Common optical aberrations include lower-order aberrations (e.g., astigmatism, positive defocus (myopia) and negative defocus (hyperopia)), and higher-order aberrations (e.g., spherical aberrations, coma, and trefoil).

Existing treatment options for correcting optical aberrations include glasses, contact lenses, and reshaping of the cornea via laser eye surgery. Additionally, intraocular lenses are often implanted to replace native lenses removed during cataract surgery.

BRIEF SUMMARY

The following presents a simplified summary of some embodiments of the invention in order to provide a basic understanding of the invention. This summary is not an extensive overview of the invention. It is not intended to identify key/critical elements of the invention nor to delineate the scope of the invention. Its sole purpose is to present some embodiments of the invention in a simplified form as a prelude to the more detailed description that is presented later.

Embodiments described herein are directed to ophthalmic lenses that include at least one subsurface optical structure (which can include diffractive optical elements and/or refractive optical elements) with enhanced distribution of refractive index values. In many embodiments, subsurface refractive index variations are formed via focusing femtosecond duration laser pulses onto a targeted sequence of subsurface volumes of an ophthalmic lens. The refractive indexes of the optical structure can vary spatially between a first limit refractive index for the optical structure and a second limit refractive index for the optical structure to provide any suitable phase changes. The refractive indexes of first sub-volumes of each optical structure can be equal to the first limit refractive index over a first section of the optical structure in which an inner perimeter and an outer perimeter of the first section of the optical structure are separated by at least 0.050 mm in length. The refractive indexes can be equal to the second limit refractive index (e.g., providing a phase change of 0.0 waves) over a second section of the optical structure in which an inner perimeter and an outer perimeter of the second section of the optical structure are separated by at least 0.050 mm in length. The enhanced distribution of refractive index values can be formed using fewer laser pulses, and lower laser energy, in comparison with a corresponding distribution of refractive index values determined via a phase scaling approach. Additionally, limiting the refractive index values to stay within a range between the first limit refractive index and the second limit refractive index may reduce damage induced by the sequence of laser pulses as compared to forming a corresponding subsurface optical structure(s) that has(have) refractive index values that are outside of the range between the first limit refractive index and the second limit refractive index. The approaches described herein may be useful in forming a subsurface optical structure(s) in any suitable ophthalmic lenses (e.g., intraocular lenses, contact lenses, corneas, glasses, and/or native lenses).

Thus, in one aspect, an ophthalmic lens includes a lens body and at least a first optical structure. The lens body is made of a transparent material. The first optical structure is disposed within a first volume of the lens body. The first optical structure includes sub-volumes of the first volume. Each of the sub-volumes of the first optical structure has a respective refractive index spatial dependence. The refractive indexes of the sub-volumes of the first optical structure vary spatially between a first limit refractive index for the first optical structure and a second limit refractive index for the first optical structure. The refractive indexes of the sub-volumes of the first optical structure are equal to the first limit refractive index for the first optical structure over a first section of the first optical structure. The first section of the first optical structure spans at least 0.050 mm in length between an inner boundary of the first section of the first optical structure and an outer boundary of the first section of the first optical structure. The refractive indexes of the sub-volumes of the first optical structure are equal to the second limit refractive index for the first optical structure over a second section of the first optical structure. The second section of the first optical structure spans at least 0.050 mm in length between an inner boundary of the second section of the first optical structure and an outer boundary of the second section of the first optical structure.

In some embodiments of the ophthalmic lens, each of the refractive indexes of the sub-volumes of the first optical structure provides a positive phase change less than 1.0 waves. For example, the first limit refractive index for the first optical structure can provide a phase change of less than 1.0 waves and greater than 0.10 waves for a wavelength within the range of the visible spectrum, spanning from 400 nm to 700 nm. The second limit refractive index for the first optical structure can provide a phase change of 0.0 waves.

In some embodiments of the ophthalmic lens, each of the refractive indexes of the sub-volumes of the first optical structure provides a negative phase change that is greater than −1.0 waves. For example, the first limit refractive index for the first optical structure can provide a phase change of greater than −1.0 waves and less than −0.10 waves for a wavelength within the range of the visible spectrum, spanning from 400 nm to 700 nm. The second limit refractive index for the first optical structure can provide a phase change of 0.0 waves.

In many embodiments of the ophthalmic lens, sub-volumes of a third section of the first optical structure have refractive indexes that vary spatially. For example, in many embodiments, the lens body has an optical axis and sub-volumes of a third section of the first optical structure have refractive indexes that vary as a function of the spatial coordinates (relative to the optical axis of the lens body) of each point within the sub-volumes of the third section. In many embodiments, the first section of the first optical structure is disposed between and separates the second section of the first optical structure and the third section of the first optical structure, and the refractive indexes of the sub-volumes of the third section of the first optical structure vary from the first limit refractive index for the first optical structure to the second limit refractive index for the first optical structure.

In many embodiments, the ophthalmic lens further includes a second optical structure disposed within a second volume of the lens body. The second optical structure includes sub-volumes of the second volume. Each of the sub-volumes of the second optical structure has a respective refractive index spatial dependence. The refractive indexes of the sub-volumes of the second volume vary spatially between a first limit refractive index for the second optical structure and a second limit refractive index for the second optical structure. The refractive indexes of the sub-volumes of the second volume are equal to the first limit refractive index for the second optical structure over a first section of the second volume. The first section of the second volume spans at least 0.021 mm in length between an inner boundary of the first section of the second volume and an outer boundary of the first section of the second volume. The refractive indexes of the sub-volumes of the second volume are equal to the second limit refractive index for the second optical structure over a second section of the second volume. The second section of the second volume spans at least 0.021 mm in length between an inner boundary of the second section of the second volume and an outer boundary of the second section of the second volume.

In some embodiments of the ophthalmic lens, each of the refractive indexes of the sub-volumes of the second volume provides a positive phase change less than 1.0 waves. For example, the first limit refractive index for the second optical structure can provide a phase change of less than 1.0 waves and greater than 0.10 waves for a wavelength within the range of the visible spectrum, spanning from 400 nm to 700 nm. The second limit refractive index for the second optical structure can provide a phase change of 0.0 waves.

In some embodiments of the ophthalmic lens, each of the refractive indexes of the sub-volumes of the second volume provides a negative phase change that is greater than −1.0 waves. For example, the first limit refractive index for the second optical structure can provide a phase change of greater than −1.0 waves and less than −0.10 waves for a wavelength within the range of the visible spectrum, spanning from 400 nm to 700 nm. The second limit refractive index for the second optical structure can provide a phase change of 0.0 waves.

In many embodiments of the ophthalmic lens, refractive indexes of sub-volumes of a section of the second optical structure vary spatially. For example, in some embodiments, sub-volumes of a third section of the second volume have refractive indexes that vary as a function of the spatial coordinates (relative to the optical axis of the lens body) of each point within the sub-volumes of the third section of the second volume. In some embodiments, the first section of the second volume is disposed between and separates the second section of the second volume and the third section of the second volume, and the refractive indexes of the sub-volumes of the third section of the second volume vary from the first limit refractive index for the second optical structure to the second limit refractive index for the second optical structure.

In many embodiments, the ophthalmic lens further includes a third optical structure disposed within a third volume of the lens body. The third optical structure includes sub-volumes of the third volume. Each of the sub-volumes of the third optical structure has a respective refractive index spatial dependence. The refractive indexes of the sub-volumes of the third optical structure vary spatially between a first limit refractive index for the third optical structure and a second limit refractive index for the third optical structure. The refractive indexes of the sub-volumes of the third optical structure are equal to the first limit refractive index for the third optical structure over a first section of the third optical structure. The first section of the third optical structure spans at least 0.016 mm in length between an inner boundary of the first section of the third optical structure and an outer boundary of the first section of the third optical structure. The refractive indexes of the sub-volumes of the third optical structure are equal to the second limit refractive index for the third optical structure over a second section of the third optical structure. The second section of the third optical structure spans at least 0.016 mm in length between an inner boundary of the second section of the third optical structure and an outer boundary of the second section of the third optical structure.

In some embodiments of the ophthalmic lens, each of the refractive indexes of the sub-volumes of the third optical structure provides a positive phase change less than 1.0 waves. For example, the first limit refractive index for the third optical structure can provide a phase change of less than 1.0 waves and greater than 0.10 waves for a wavelength within the range of the visible spectrum, spanning from 400 nm to 700 nm. The second limit refractive index for the third optical structure can provide a phase change of 0.0 waves.

In some embodiments of the ophthalmic lens, each of the refractive indexes of the sub-volumes of the third optical structure provides a negative phase change that is greater than −1.0 waves. For example, the first limit refractive index for the third optical structure can provide a phase change of greater than −1.0 waves and less than −0.10 waves for a wavelength within the range of the visible spectrum, spanning from 400 nm to 700 nm. The second limit refractive index for the third optical structure can provide a phase change of 0.0 waves.

In many embodiments of the ophthalmic lens, refractive indexes of sub-volumes of a section of the third optical structure vary spatially. For example, in some embodiments, sub-volumes of a third section of the third optical structure have refractive indexes that vary as a function of the spatial coordinates (relative to the optical axis of the lens body) of each point within the sub-volumes of the third section of the third optical structure. In some embodiments, the first section of the third optical structure is disposed between and separates the second section of the third optical structure and the third section of the third optical structure, and the refractive indexes of the sub-volumes of the third section of the third optical structure vary from the first limit refractive index for the third optical structure to the second limit refractive index for the third optical structure.

The ophthalmic lens can be any suitable type of ophthalmic lens. For example, in some embodiments the lens body includes a contact lens. In some embodiments, the lens body includes an intraocular lens.

In another aspect, a method of forming a subsurface optical structure includes forming a first optical structure disposed within a first volume of a lens body. The first optical structure includes sub-volumes of the first volume. Each of the sub-volumes of the first optical structure has a respective refractive index spatial dependence. The refractive indexes of the sub-volumes of the first optical structure vary spatially between a first limit refractive index for the first optical structure and a second limit refractive index for the first optical structure. The refractive indexes of the sub-volumes of the first optical structure are equal to the first limit refractive index for the first optical structure over a first section of the first optical structure. The first section of the first optical structure spans at least 0.050 mm in length between an inner boundary of the first section of the first optical structure and an outer boundary of the first section of the first optical structure. The refractive indexes of the sub-volumes of the first optical structure are equal to the second limit refractive index for the first optical structure over a second section of the first optical structure. The second section of the first optical structure spans at least 0.050 mm in length between an inner boundary of the second section of the first optical structure and an outer boundary of the second section of the first optical structure.

In some embodiments of the method, each of the refractive indexes of the sub-volumes of the first optical structure provides a positive phase change less than 1.0 waves. For example, the first limit refractive index for the first optical structure can provide a phase change of less than 1.0 waves and greater than 0.10 waves in a visible spectrum from 400 nm to 700 nm. The second limit refractive index for the first optical structure can provide a phase change of 0.0 waves.

In some embodiments of the method, each of the refractive indexes of the sub-volumes of the first optical structure provides a negative phase change that is greater than −1.0 waves. For example, the first limit refractive index for the first optical structure can provide a phase change of greater than −1.0 waves and less than −0.10 waves in a visible spectrum from 400 nm to 700 nm. The second limit refractive index for the first optical structure can provide a phase change of 0.0 waves.

In many embodiments of the methods, sub-volumes of a third section of the first optical structure have refractive indexes that vary spatially. For example, in many embodiments of the method, the lens body has an optical axis and sub-volumes of a third section of the first optical structure have refractive indexes that vary as a function of coordinates of the sub-volumes of a third section of the first optical structure relative to the optical axis. In many embodiments of the method, the first section of the first optical structure is disposed between and separates the second section of the first optical structure and the third section of the first optical structure, and the refractive indexes of the sub-volumes of the third section of the first optical structure vary from the first limit refractive index for the first optical structure to the second limit refractive index for the first optical structure.

In many embodiments, the method includes forming a second optical structure within a second volume of the lens body. The second optical structure includes sub-volumes of the second volume. Each of the sub-volumes of the second optical structure has a respective refractive index spatial dependence. The refractive indexes of the sub-volumes of the second volume vary spatially between a first limit refractive index for the second optical structure and a second limit refractive index for the second optical structure. The refractive indexes of the sub-volumes of the second volume are equal to the first limit refractive index for the second optical structure over a first section of the second volume. The first section of the second volume spans at least 0.021 mm in length between an inner boundary of the first section of the second volume and an outer boundary of the first section of the second volume. The refractive indexes of the sub-volumes of the second volume are equal to the second limit refractive index for the second optical structure over a second section of the second volume. The second section of the second volume spans at least 0.021 mm in length between an inner boundary of the second section of the second volume and an outer boundary of the second section of the second volume.

In some embodiments of the method, each of the refractive indexes of the sub-volumes of the second volume provides a positive phase change less than 1.0 waves. For example, the first limit refractive index for the second optical structure can provide a phase change of less than 1.0 waves and greater than 0.10 waves in a visible spectrum from 400 nm to 700 nm. The second limit refractive index for the second optical structure can provide a phase change of 0.0 waves.

In some embodiments of the method, each of the refractive indexes of the sub-volumes of the second volume provide a negative phase change that is greater than −1.0 waves. For example, the first limit refractive index for the second optical structure can provide a phase change of greater than −1.0 waves and less than −0.10 waves in a visible spectrum from 400 nm to 700 nm. The second limit refractive index for the second optical structure can provide a phase change of 0.0 waves.

In many embodiments of the method, refractive indexes of sub-volumes of a section of the second optical structure vary spatially. For example, in some embodiments of the method, sub-volumes of a third section of the second volume have refractive indexes that vary as a function of coordinates of the sub-volumes of the third section of the second volume relative to an optical axis of the lens body. In some embodiments of the method, the first section of the second volume is disposed between and separates the second section of the second volume and the third section of the second volume, and the refractive indexes of the sub-volumes of the third section of the second volume vary from the first limit refractive index for the second optical structure to the second limit refractive index for the second optical structure.

In many embodiments, the method includes forming a third optical structure within a third volume of the lens body. The third optical structure includes sub-volumes of the third volume. Each of the sub-volumes of the third optical structure has a respective refractive index spatial dependence. The refractive indexes of the sub-volumes of the third optical structure vary spatially between a first limit refractive index for the third optical structure and a second limit refractive index for the third optical structure. The refractive indexes of the sub-volumes of the third optical structure are equal to the first limit refractive index for the third optical structure over a first section of the third optical structure. The first section of the third optical structure spans at least 0.016 mm in length between an inner boundary of the first section of the third optical structure and an outer boundary of the first section of the third optical structure. The refractive indexes of the sub-volumes of the third optical structure are equal to the second limit refractive index for the third optical structure over a second section of the third optical structure. The second section of the third optical structure spans at least 0.016 mm in length between an inner boundary of the third section of the third optical structure and an outer boundary of the second section of the third optical structure.

In some embodiments of the method, each of the refractive indexes of the sub-volumes of the third optical structure provides a positive phase change less than 1.0 waves. For example, the first limit refractive index for the third optical structure can provide a phase change of less than 1.0 waves and greater than 0.10 waves in a visible spectrum from 400 nm to 700 nm. The second limit refractive index for the third optical structure can provide a phase change of 0.0 waves.

In some embodiments of the method, each of the refractive indexes of the sub-volumes of the third optical structure provides a negative phase change that is greater than −1.0 waves. For example, the first limit refractive index for the third optical structure can provide a phase change of greater than −1.0 waves and less than −0.10 waves in a visible spectrum from 400 nm to 700 nm. The second limit refractive index for the third optical structure can provide a phase change of 0.0 waves.

In many embodiments of the method, refractive indexes of sub-volumes of a section of the third optical structure vary spatially. For example, in some embodiments of the method, sub-volumes of a third section of the third optical structure have refractive indexes that vary as a function of coordinates of the sub-volumes of the third section of the third optical structure relative to an optical axis of the lens body. In some embodiments of the method, the first section of the third optical structure is disposed between and separates the second section of the third optical structure and the third section of the third optical structure, and the refractive indexes of the sub-volumes of the third section of the third optical structure vary from the first limit refractive index for the third optical structure to the second limit refractive index for the third optical structure.

The ophthalmic lens can be any suitable type of ophthalmic lens. For example, in some embodiments of the method, the lens body includes a contact lens. In some embodiments of the method, the lens body includes an intraocular lens. In some embodiments of the method, the first optical structure is formed within an intraocular lens with the intraocular lens in an implanted state within an eye of a patient. In some embodiments of the method, the lens body includes the cornea of the human eye. In some embodiments of the method, the first optical structure is formed within the tissue of the cornea of a patient in vivo.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
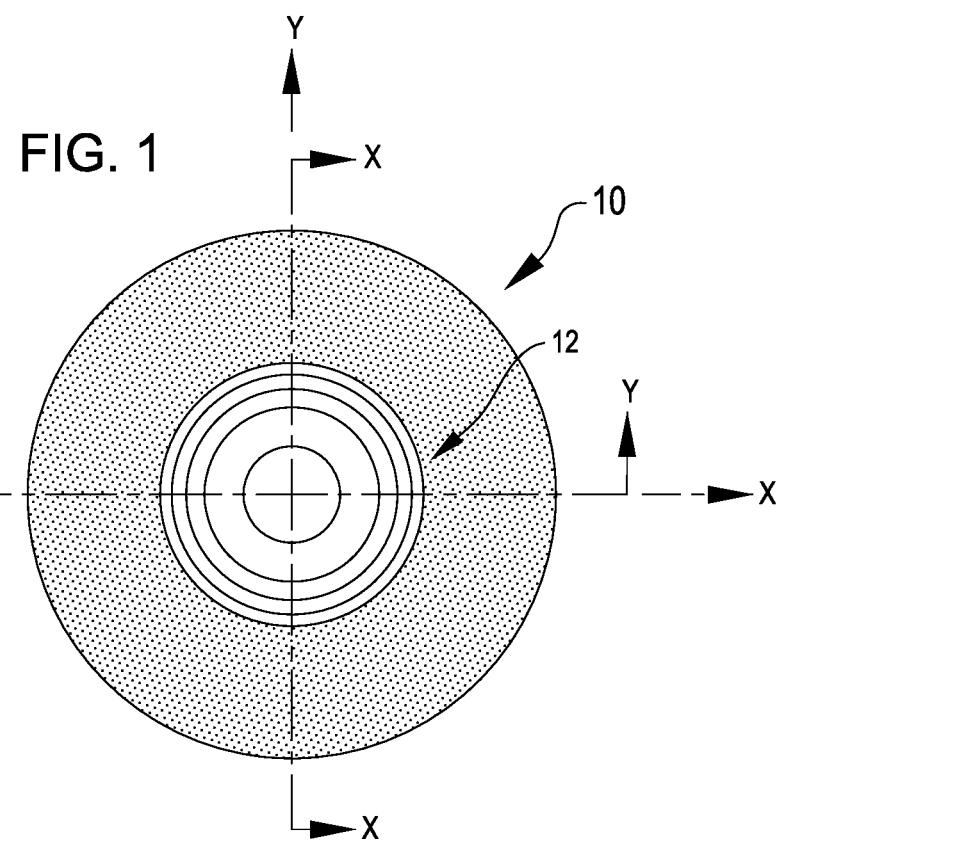
FIG. 1 is a plan view illustration of an ophthalmic lens that includes subsurface optical structures with enhanced distribution of refractive index variations, in accordance with embodiments.

Turning now to the drawing figures, in which like reference numbers refer to like elements in the various figures, FIG. 1 is a plan view illustration of an ophthalmic lens 10 that includes one or more subsurface optical structures 12 with refractive index spatial variations, in accordance with embodiments. The one or more subsurface structures 12 described herein can be formed in any suitable type of ophthalmic lens including, but not limited to, intra-ocular lenses, contact lenses, corneas, spectacle lenses, and native lenses (e.g., a human native lens). The one or more subsurface optical structures 12 with refractive index spatial variations can be configured to provide a suitable refractive correction for each of many optical aberrations such as astigmatism, myopia, hyperopia, spherical aberrations, coma and trefoil, as well as any suitable combination thereof.

Figure 2:
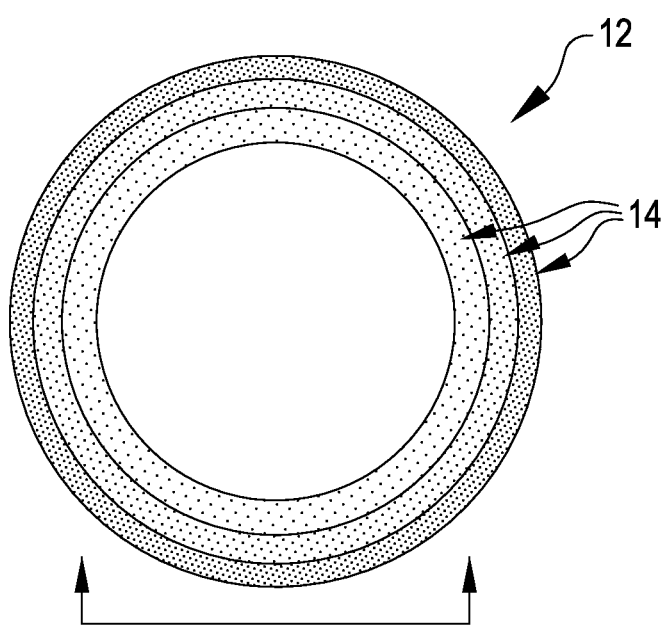
FIG. 2 is a plan view illustration of one of the subsurface optical structures of the ophthalmic lens of FIG. 1.

FIG. 2 is a plan view illustration of one of the subsurface optical structures 12 of the ophthalmic lens 10. The illustrated optical substructure 12 occupies a respective volume of the lens 10, which includes associated sub-volumes of the lens 10. In many embodiments, the volume occupied by one of the optical structures 12 includes first, second, and third sections 14. Each of the first, second, and third sections 14 can be formed by focusing suitable laser pulses inside the respective section 14 so as to induce changes in refractive index in sub-volumes of the lens 10 that make up the respective section 14 so that each section 14 has a respective refractive index distribution as described herein.

In many embodiments, a refractive index distribution is defined for each section 14 that forms the subsurface optical structures 12 so that the resulting subsurface optical structures 12 provide a desired optical correction. The refractive index distribution for each section 14 can be used to determine parameters (e.g., laser pulse power (mW), laser pulse width (fs), scanning speed of the laser pulse (mm/s)) of laser pulses that are focused onto the respective sections 14 to induce the desired refractive index distributions in the sections 14.

While the sections 14 of the subsurface optical structures 12 have a circular shape as seen from the plan view in the illustrated embodiment, the sections 14 can have any suitable shape and distribution of refractive index variations. For example, a single section 14 having an overlapping spiral shape when viewed from the plan view can be employed. In general, one or more sections 14 having any suitable shapes when viewed from the plan view can be distributed with intervening spaces so as to provide a desired optical correction for light incident on the subsurface optical structure 12.

Figure 3:
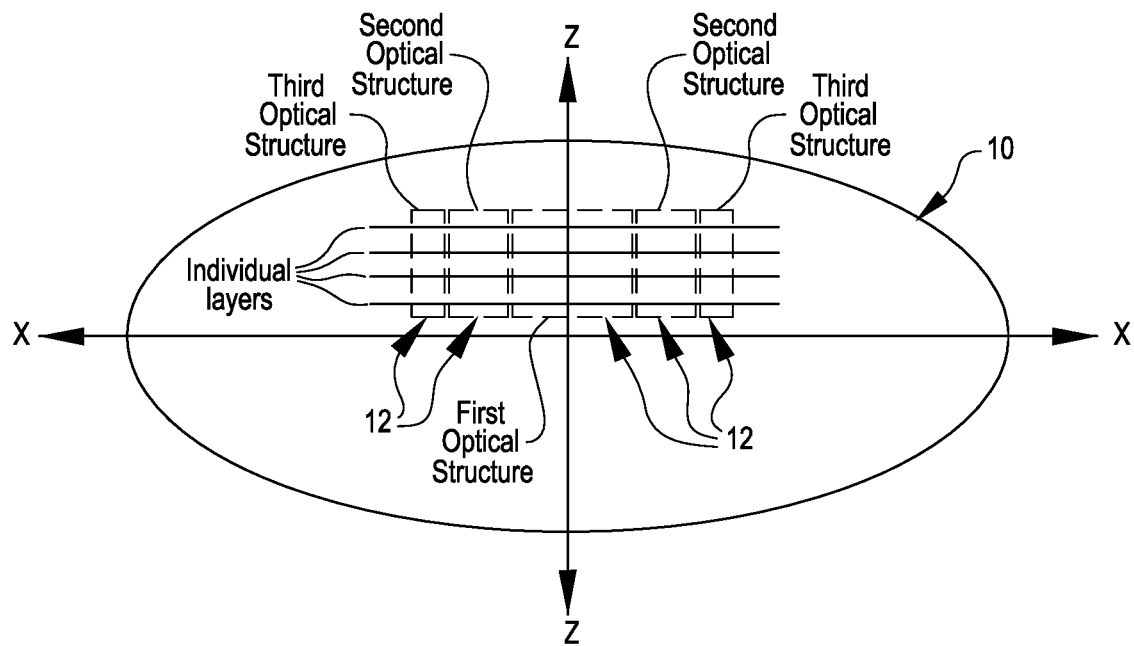
FIG. 3 is a side view illustration of the subsurface optical structures of FIG. 1.

FIG. 3 illustrates an embodiment in which the subsurface optical structures 12 are comprised of several stacked layers that are separated by intervening layer spaces. In the illustrated embodiment, the subsurface optical structures 12 have a spatial distribution of refractive index variations. FIG. 3 is a side view illustration of an example distribution of refractive index variations in the subsurface optical structures 12. In the illustrated embodiment, the subsurface optical structures 12 can be formed using a raster scanning approach in which each layer is sequentially formed starting with the bottom layer and working upward. For each layer, a raster scanning approach can sequentially scan the focal position of the laser pulses along planes of constant Z-dimension while varying the Y-dimension and the X-dimension so that the resulting layers have the flat cross-sectional shapes shown in FIG. 3, which shows a cross-sectional view of the ophthalmic lens 10. In the raster scanning approach, timing of the laser pulses can be controlled to focus each laser pulse onto a targeted sub-volume of the ophthalmic lens 10 and not focus laser pulses onto non-targeted sub-volumes of the ophthalmic lens 10, which include sub-volumes of the ophthalmic lens 10 that do not form any of the subsurface optical structures 12, such as the intervening spaces between the adjacent stacked layers that can form the subsurface optical structures 12.

In the illustrated embodiment, there are three annular subsurface optical structures 12 with distributions of refractive index spatial variations. Each of the illustrated subsurface optical structures 12 has a flat layer configuration and can be comprised of one or more layers. If the subsurface optical structures are comprised of more than one layer, the layers can be separated from each other by an intervening layer spacing. Each of the layers, however, can alternatively have any other suitable general shape including, but not limited to, any suitable non-planar or planar surface. In the illustrated embodiment, each of the subsurface optical structures 12 has a circular outer boundary as seen from the plan view. Each of the subsurface optical structures 12, however, can alternatively have any other suitable outer boundary shape. Each of the subsurface optical structures 12 can include two or more separate sections 14 with each covering a fraction of the area of the subsurface optical structures 12 as seen from the plan view.

Figure 4:
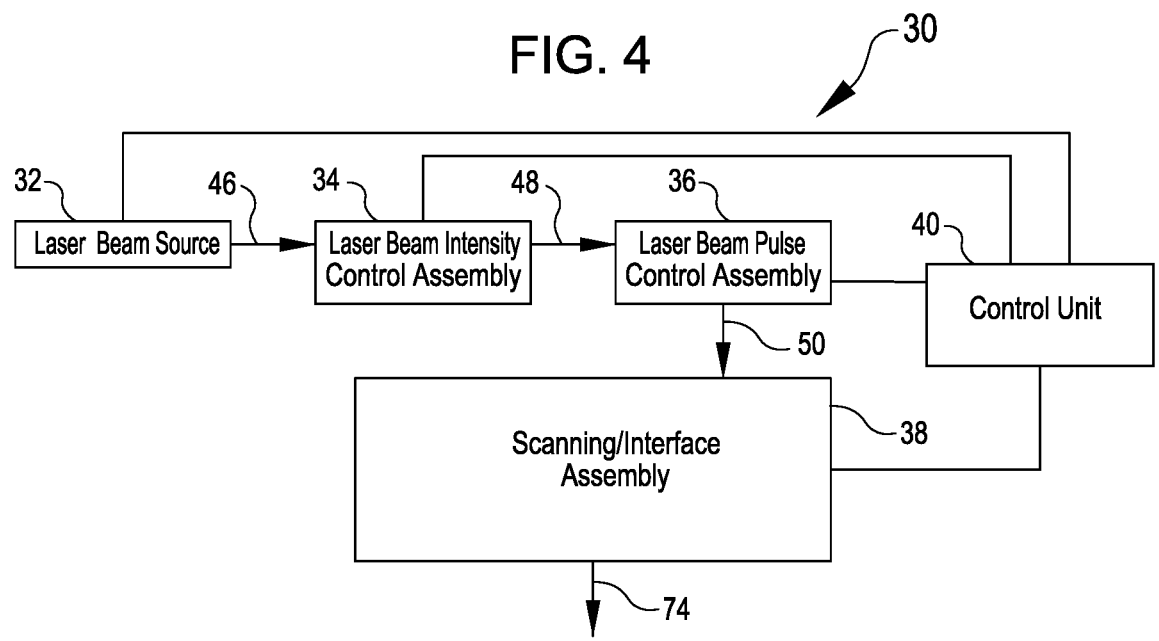
FIG. 4 is a simplified schematic illustration of a system for forming one or more subsurface optical structures within an ophthalmic lens, in accordance with embodiments.

FIG. 4 is a simplified schematic illustration of a system 30 for forming one or more subsurface optical structures 12 within an ophthalmic lens 10, in accordance with embodiments. The system 30 includes a laser beam source 32, a laser beam intensity control assembly 34, a laser beam pulse control assembly 36, a scanning/interface assembly 38, and a control unit 40.

The laser beam source 32 generates and emits a laser beam 46 having a suitable wavelength for inducing refractive index changes in target sub-volumes of the ophthalmic lens 10. In examples described herein, the laser beam 46 has a 1035 nm central wavelength. The laser beam 46, however, can have any suitable wavelength (e.g., in a range from 400 to 1100 nm) effective in inducing refractive index changes in the target sub-volumes of the ophthalmic lens 10.

The laser beam intensity control assembly 34 is controllable to selectively vary intensity of the laser beam 46 to produce a selected intensity laser beam 48 output to the laser beam pulse control assembly 36. The laser beam intensity control assembly 34 can have any suitable configuration, including any suitable existing configuration, to control the intensity of the resulting laser beam 48.

The laser beam pulse control assembly 36 is controllable to generate collimated laser beam pulses 50 having suitable duration, intensity, size, and spatial profile for inducing refractive index changes in the target sub-volumes of the ophthalmic lens 10. The laser beam pulse control assembly 36 can have any suitable configuration, including any suitable existing configuration, to control the duration of the resulting laser beam pulses 50.

The scanning/interface assembly 38 is controllable to selectively scan the laser beam pulses 50 to produce XYZ scanned laser pulses 74. The scanning/interface assembly 38 can have any suitable configuration, including any suitable existing configuration (for example, the configuration illustrated in FIG. 5) to produce the XYZ scanned laser pulses 74. The scanning/interface assembly 38 receives the laser beam pulses 50 and outputs the XYZ scanned laser pulses 74 in a manner that minimizes vignetting. The scanning/interface assembly 38 is controlled to selectively scan each of the laser beam pulses 50 to generate XYZ scanned laser pulses 74 focused onto targeted sub-volumes of the ophthalmic lens 10 to induce the respective refractive index changes in targeted sub-volumes so as to form the one or more subsurface optical structures 12 within an ophthalmic lens 10. In many embodiments, the scanning/interface assembly 38 is configured to restrain the position of the ophthalmic lens 10 to a suitable degree to suitably control the location of the targeted sub-volumes of the ophthalmic lens 10 relative to the scanning/interface assembly 38. In many embodiments, such as the embodiment illustrated in FIG. 5, the scanning/interface assembly 38 includes a motorized Z-stage that is controlled to selectively control the depth within the ophthalmic lens 10 at which each of the XYZ scanned laser pulses 74 is focused.

The control unit 40 is operatively coupled with each of the laser beam source 32, the laser beam intensity control assembly 34, the laser beam pulse control assembly 36, and the scanning/interface assembly 38. The control unit 40 provides coordinated control of each of the laser beam source 32, the laser beam intensity control assembly 34, the laser beam pulse control assembly 36, and the scanning/interface assembly 38 so that each of the XYZ scanned laser pulses 74 have a selected intensity and duration, and are focused onto a respective selected sub-volume of the ophthalmic lens 10 to form the one or more subsurface optical structures 12 within an ophthalmic lens 10. The control unit 40 can have any suitable configuration. For example, in some embodiments, the control unit 40 comprises one or more processors and a tangible memory device storing instructions executable by the one or more processors to cause the control unit 40 to control and coordinate operation of the laser beam source 32, the laser beam intensity control assembly 34, the laser beam pulse control assembly 36, and the scanning/interface assembly 38 to produce the XYZ scanned laser pulses 74, each of which is synchronized with the spatial position of the sub-volume optical structure.

Figure 5:
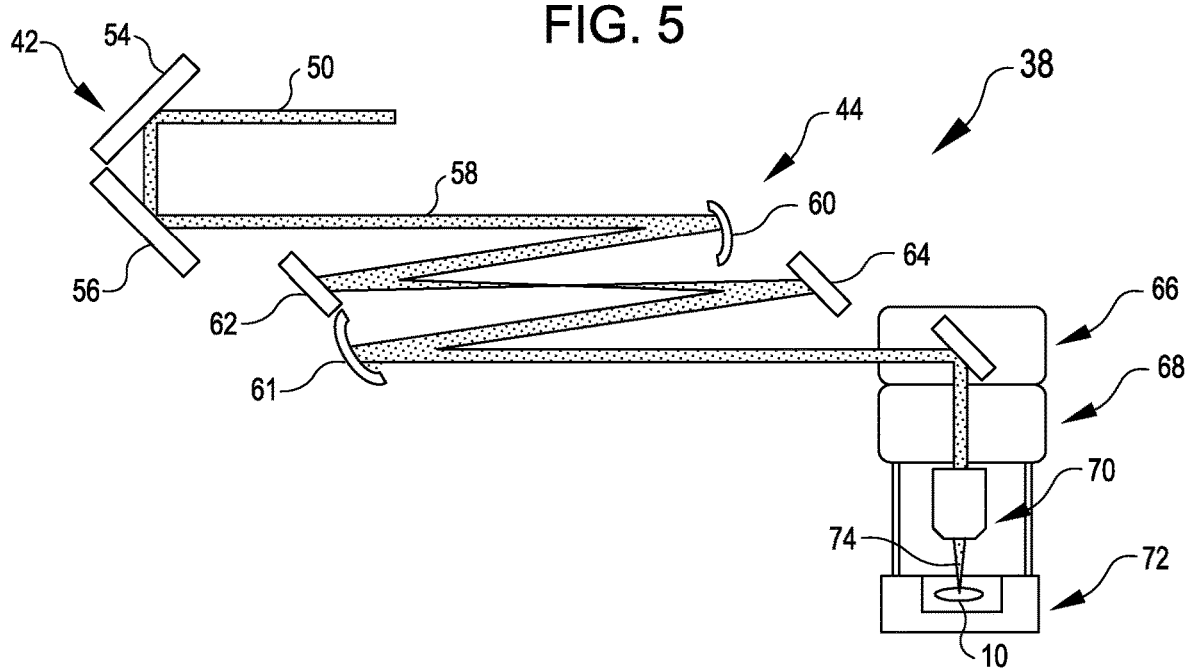
FIG. 5 is a simplified schematic diagram of some components in the system of FIG. 4.

FIG. 5 is a simplified schematic illustration of an embodiment of the scanning/interface assembly 38. In the illustrated embodiment, the scanning/interface assembly 38 includes an XY galvo scanning unit 42, a relay optical assembly 44, a Z stage 66, an XY stage 68, a focusing objective lens 70, and a patient interface/ophthalmic lens holder 72. The XY galvo scanning unit 42 includes XY galvo scan mirrors 54, 56. The relay optical assembly 44 includes concave mirrors 60, 61 and plane mirrors 62, 64.

The XY galvo scanning unit 42 receives the laser pulses 50 (e.g., 1035 nm central wavelength collimated laser pulses) from the laser beam pulse control assembly 36. In the illustrated embodiment, the XY galvo scanning unit 42 includes a motorized X-direction scan mirror 54 and a motorized Y-direction scan mirror 56. The X-direction scan mirror 54 is controlled to selectively vary orientation of the X-direction scan mirror 54 to vary direction/position of XY scanned laser pulses 58 in an X-direction transverse to direction of propagation of the XY scanned laser pulses 58. The Y-direction scan mirror 56 is controlled to selectively vary orientation of the Y-direction scan mirror 56 to vary direction/position of the XY scanned laser pulses 58 in an Y-direction transverse to direction of propagation of the XY scanned laser pulses 58. In many embodiments, the Y-direction is substantially perpendicular to the X-direction.

The relay optical assembly 44 receives the XY scanned laser pulses 58 from the XY galvo scanning unit 42 and transfers the XY scanned laser pulses 58 to the Z stage 66 in a manner that minimizes vignetting. Concave mirror 60 reflects each of the XY scanned laser pulses 58 to produce a converging laser pulses incident on plane mirror 62. Plane mirror 62 reflects the converging XY scanned laser pulse 58 towards plane mirror 64. Between the plane mirror 62 and the plane mirror 64, the XY scanned laser pulse 58 transitions from being convergent to being divergent. The divergent laser pulse 58 is reflected by plane mirror 64 onto concave mirror 61. Concave mirror 61 reflects the laser pulse 58 to produce a collimated laser pulse that is directed to the Z stage 66.

The Z stage 66 receives the XY scanned laser pulses 58 from the relay optical assembly 44. In the illustrated embodiment, the Z stage 66 and the XY stage 68 are coupled to the focusing objective lens 70 and controlled to selectively position the focusing objective lens 70 relative to the ophthalmic lens 10 for each of the XY scanned laser pulses 74 so as to focus the XYZ scanned laser pulse 74 onto a respective targeted sub-volume of the ophthalmic lens 10. The Z stage 66 is controlled to selectively control the depth within the ophthalmic lens 10 at which the laser pulse is focused (i.e., the depth of the sub-surface volume of the ophthalmic lens 10 on which the laser pulse is focused to induce a change in refractive index of the targeted sub-surface volume). The XY stage 68 is controlled in conjunction with control of the XY galvo scanning unit 42 so that the focusing objective lens 70 is suitably positioned for the respective transverse position of each of the XY scanned laser pulses 58 received by the Z stage 66. The focusing objective lens 70 converges the laser pulse onto the targeted sub-surface volume of the lens 10. The patient interface/ophthalmic lens holder 72 restrains the ophthalmic lens 10 in a fixed position to support scanning of the laser pulses 74 by the scanning/interface assembly 38 to form the subsurface optical structures 12.

Figure 6A:
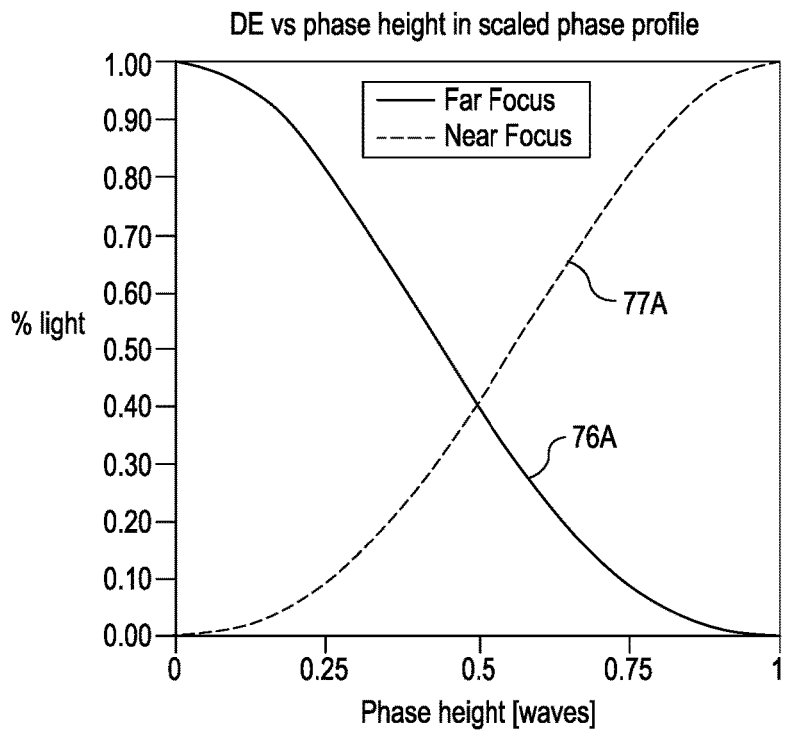
FIG. 6A graphically illustrates diffraction efficiency for near focus and far focus versus phase change height for a scaled phase profile.

FIG. 6A graphically illustrates diffraction efficiency for far focus 76A and near focus 77A versus phase change height for a scaled phase-wrapped phase distribution in which the maximum phase available is given by phase change height. For a phase change height of 0.25 waves, the diffraction efficiency for near focus is only about 10 percent. For an overall optical correction with a near focus diffraction efficiency substantially greater than 10 percent, a greater number of stacked layers can be used to form the subsurface optical structures 12 with a phase change height larger than 0.25 waves that produce the desired near focus diffraction efficiency. It may be desirable, however, to limit the number of stacked layers forming the subsurface optical structures 12 that are necessary to generate a desired near focus diffraction efficiency. Greater phase change heights can also be achieved by inducing greater refractive index changes in the targeted sub-volumes of the ophthalmic lens 10. Greater refractive index changes in the targeted sub-volumes of the ophthalmic lens 10 can be induced by increasing energy of the laser pulses focused onto the targeted sub-volumes of the ophthalmic lens 10. It may be desirable, however, to limit the energy of the laser pulses to avoid substantial pulse energy associated damage of the material forming the lens 10.

Figure 6B:
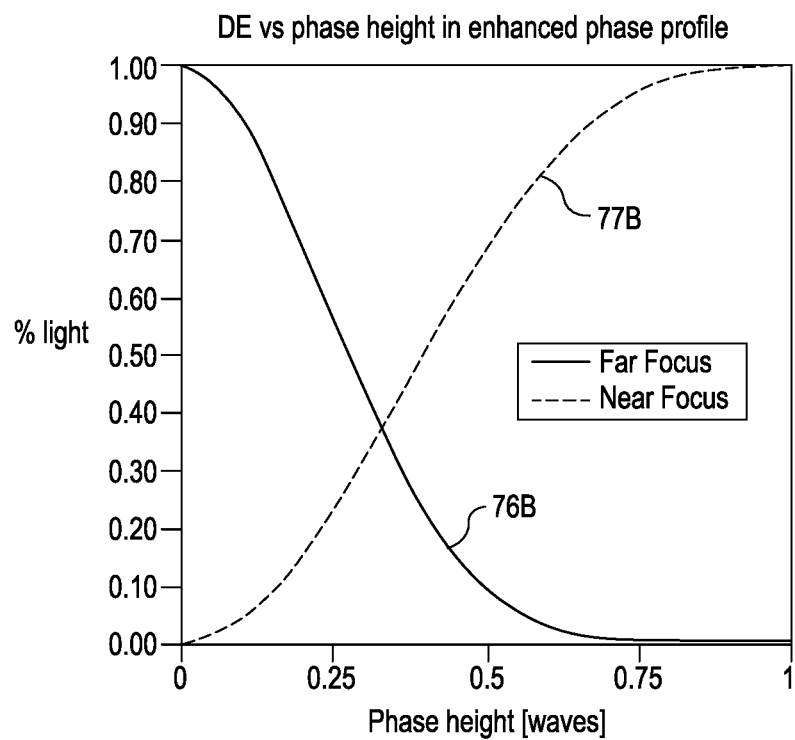
FIG. 6B graphically illustrates diffraction efficiency for near focus and far focus versus phase change height for an enhanced phase profile.

Greater diffraction efficiencies can be obtained at the near focus at a given phase change height by using an enhanced phase-wrapped phase distribution as described herein. For example, FIG. 6B graphically illustrates diffraction efficiency for far focus 76B and near focus 77B versus phase change height for an enhanced phase-wrapped phase distribution as described herein. For a phase change height of 0.25 waves, for example, the enhanced phase-wrapped phase distribution results in a diffraction efficiency for near focus of about 20 percent, which is about twice the value as for the scaled wrapped phase distribution of FIG. 6A at this same phase change height.

Figure 7:
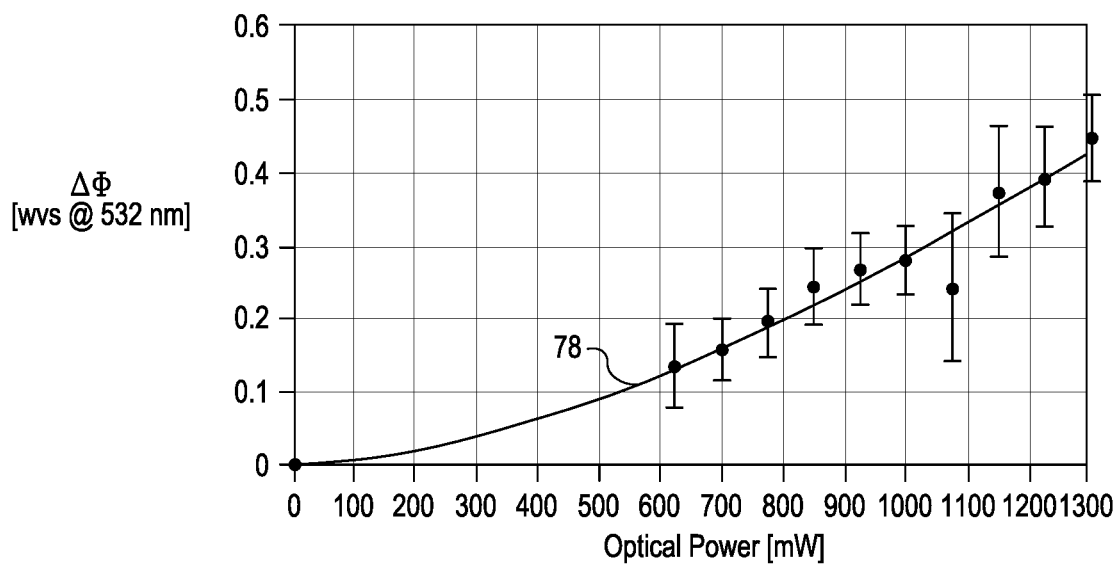
FIG. 7 graphically illustrates an example calibration curve for resulting phase change height as a function of laser pulse train optical power.

FIG. 7 graphically illustrates an example calibration curve 78 for resulting phase change height as a function of laser pulse optical power. The calibration curve 78 shows correspondence between resulting phase change height as a function of laser average power for a corresponding laser pulse duration, laser pulse central wavelength, laser pulse repetition rate, numerical aperture, material of the ophthalmic lens 10, depth of the targeted sub-volume, spacing between the layers, line spacing between the individual scan lines, and scanning speed. The calibration curve 78 shows that increasing laser pulse energy results in increased phase change height.

Laser pulse energy, however, may be limited to avoid propagation of induced damage caused by laser pulse energy and/or heat accumulation with the ophthalmic lens 10 along and across the sections 14, or even between different layers. In many instances, there is no observed damage during the formation of the first two layers and damage starts to occur during the formation of the third layer. To avoid such damage, the formation of an optical structures 12 can be accomplished by using laser pulse energy far below a pulse energy threshold of the material of the ophthalmic lens 10. Using lower pulse energy, however, increases the number of layers required in the subsurface optical structures 12 to provide the same amount of resulting phase change height, thereby adding to the time required to form the total number of subsurface optical structures 12 employed. For in-vivo applications (for example, writing the subsurface optical structures 12 into an implanted intra-ocular lens), requiring additional layers to comprise subsurface optical structures 12 may potentially increase an overall amount of energy that is deposited into the retina. Using an enhanced phase-wrapped phase distribution necessitates a smaller number of layers to form subsurface optical structures 12 and achieve the desired visual outcomes at near focus, such as larger modulation transfer function and larger diffraction efficiency values.

Enhanced Phase-Wrapped Phase Distribution

Figure 8:
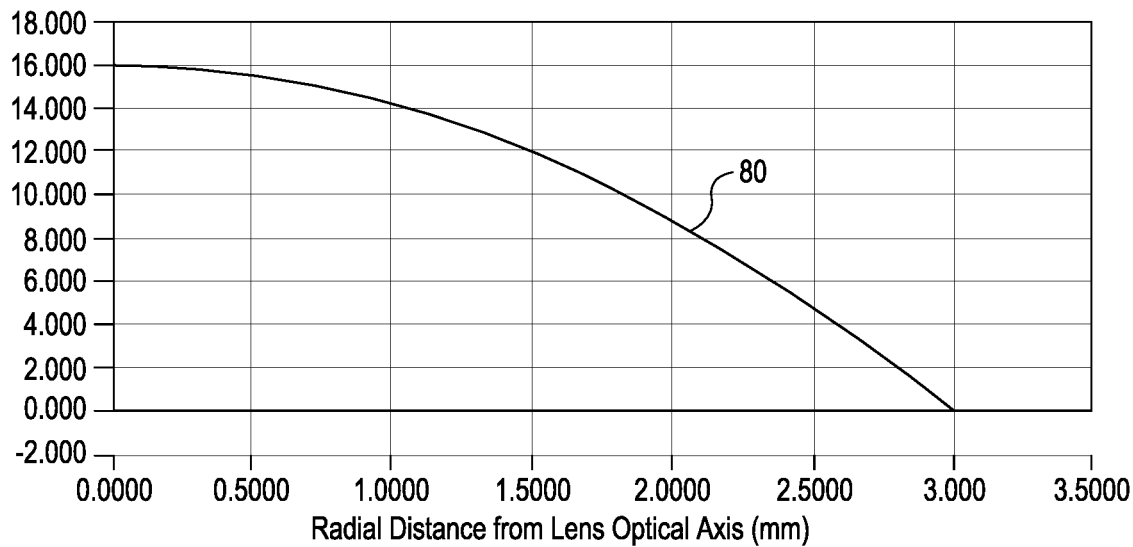
FIG. 8 shows a radial variation in units of optical waves at a wavelength of 562.5 nm for a 2.0 diopter phase distribution, in accordance with embodiments.

FIG. 8 shows a radial variation in units of optical waves for a 2.0 diopter phase distribution 80, in accordance with embodiments. The optical waves in this curve correspond to a design wavelength of 562.5 nm. In the illustrated embodiment, the 2.0 diopter phase distribution 80 decreases from a maximum of 16.0 waves at the optical axis of an ophthalmic lens down to 0.0 waves at 3.0 mm from the optical axis.

Figure 9:
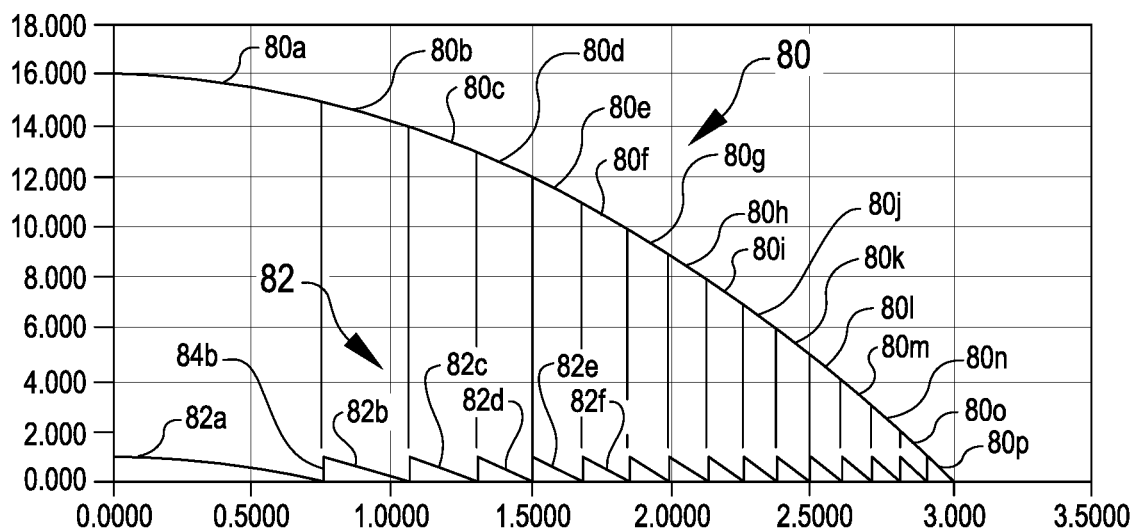
FIG. 9 shows a 1.0 wave phase-wrapped phase distribution corresponding to the 2.0 diopter phase distribution of FIG. 8.

FIG. 9 shows a 1.0 wave phase-wrapped phase distribution 82 corresponding to the 2.0 diopter phase distribution 80. Each section of the 1.0 wave phase-wrapped phase distribution 82 includes a sloped section (82-*a* through 82-*p*). Each of all the sections, except the center section, of the 1.0 wave phase-wrapped phase distribution 82 includes a phase discontinuity (84-*b* through 84-*p*) with a height equal to 1.0 wave. Each of the sloped sections (82-*a* through 82-*p*) is shaped to match the corresponding overlying section (80-*a* through 80-*p*) of the 2.0 diopter phase distribution 80. For example, sloped section 82-*p* matches overlying section 80-*p*; sloped section 82-*o* is equal to overlying section 80-*o* minus 1.0 wave; sloped section 82-*n* is equal to overlying section 80-*n* minus 2.0 waves; sloped section 82-*a* is equal to overlying section 80-*a* minus 15.0 waves. Each sloped section corresponds to a Fresnel zone. The area or region occupied by each Fresnel zone corresponds to the area occupied by each subsurface optical structure 12.

The 1.0 wave height of each of the phase discontinuities (84-*b* through 84-*p*) in 82 results in diffraction at the design wavelength that provides the same 2.0 diopter correction as the 2.0 diopter refractive distribution 80 while limiting the maximum phase equal to 1.0 wave.

The 1.0 wave phase-wrapped phase distribution 82 requires substantially lower total laser pulse energy to induce in comparison to the 2.0 diopter phase distribution 80. The area under the 1.0 wave phase-wrapped phase distribution 82 is only about 5.2 percent of the area under the 2.0 diopter phase distribution 80.

Figure 10:
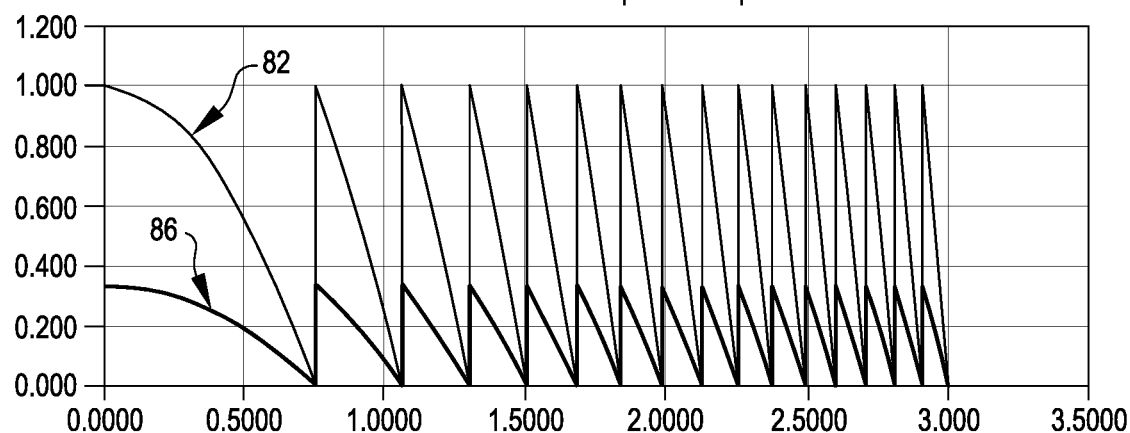
FIG. 10 shows the 1.0 wave phase-wrapped phase distribution of FIG. 9 and it also shows the ⅓ optical wave maximum scaled phase-wrapped phase distribution corresponding to the 1.0 wave phase-wrapped phase distribution of FIG. 9.

FIG. 10 shows the 1.0 wave phase-wrapped phase distribution 82 and an example scaled phase-wrapped phase distribution (for a selected maximum wave value) corresponding to the 1.0 wave phase-wrapped phase distribution 82. In the illustrated embodiment, the example scaled phase-wrapped phase distribution has a maximum wave value of ⅓ wave. Similar scaled phase-wrapped phase distributions can be generated for other suitable maximum wave values less than 1.0 wave (e.g., ¾ wave, ⅝ wave, ½ wave, ¼ wave, ⅙ wave). The ⅓ optical wave maximum scaled phase-wrapped phase distribution 86 is equal to ⅓ of the 1.0 wave phase-wrapped phase distribution 82. The ⅓ optical wave maximum scaled phase-wrapped phase distribution 86 is one substitute for the 1.0 wave phase-wrapped phase distribution 82 and it utilizes a maximum phase value of ⅓ wave optical correction.

The ⅓ optical wave maximum scaled phase-wrapped phase distribution 86 requires less total laser pulse energy to induce in comparison with the 1.0 wave phase-wrapped phase distribution 82. The area under the ⅓ optical wave maximum scaled phase-wrapped phase distribution 86 is ⅓ of the area under the 1.0 wave phase-wrapped phase distribution 82.

Figure 11:
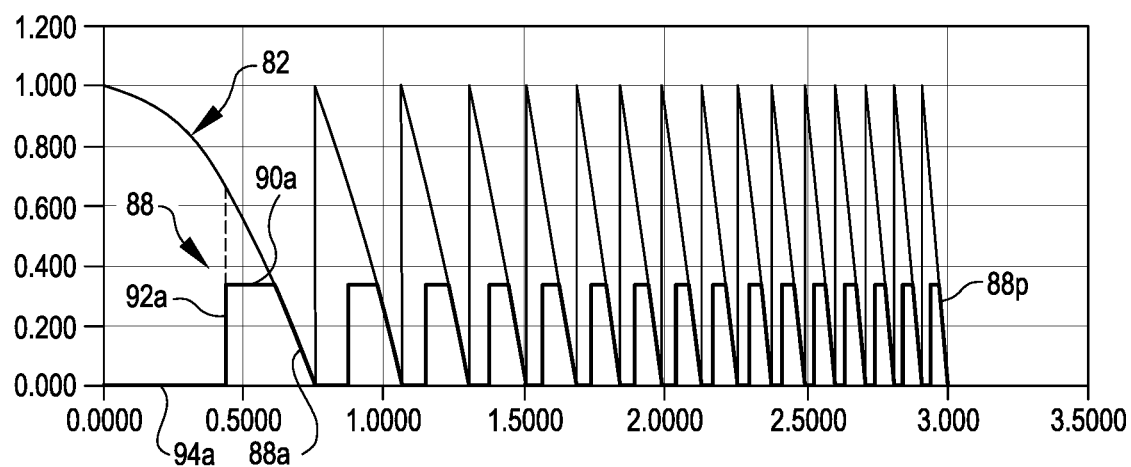
FIG. 11 shows the 1 wave phase-wrapped phase distribution of FIG. 9 and it also shows the ⅓ optical wave maximum enhanced phase-wrapped phase distribution corresponding to the 1.0 wave phase-wrapped phase distribution of FIG. 9.

FIG. 11 shows the 1.0 wave phase-wrapped phase distribution 82 and an example enhanced phase-wrapped phase distribution (for a selected maximum wave value) corresponding to the 1.0 wave phase-wrapped phase distribution 82. In the illustrated embodiment, the example enhanced phase-wrapped phase distribution has a maximum wave value of ⅓ wave. Similar enhanced phase-wrapped phase distributions can be generated for other suitable maximum wave values less than 1.0 wave (e.g., ¾ wave, ⅝ wave, ½ wave, ¼ wave, ⅙ wave) using a similar approach.

The ⅓ optical wave maximum enhanced phase-wrapped phase distribution 88 includes sloped sections (88 *a-p*), top sections (90 *a-p*), phase discontinuities (92 *a-p*), and bottom sections (94 *a-p*). Each of the sloped sections (88 *a-p*) matches a corresponding one of the sloped sections (82 *a-p*) of the 1.0 wave phase-wrapped phase distribution 82. In regions where the wave values of the 1.0 wave phase-wrapped phase distribution 82 are greater than the applicable maximum wave value (which in the ⅓ optical wave maximum enhanced phase-wrapped phase distribution 88 is ⅓ wave), the value of the ⅓ optical wave maximum enhanced phase-wrapped phase distribution 88 is either equal to the applicable maximum wave value (as indicated by the top sections (90 *a-p*)) or equal to 0.0 (as indicated by the bottom sections (94 *a-p*)). The top sections (90 *a-p*) extend radially (with the optical axis representing a radius of zero) in the annular zones between the radial locations at which the phase in the 1.0 wave phase-wrapped phase distribution 82 is the applicable maximum wave value (⅓ wave in this example) and the radial locations at which the phase in the 1.0 wave wrapped phase distribution 82 is the phase given by the calculation "(1.0— the applicable maximum wave value)/2.0" (which for the ⅓ optical wave maximum enhanced phase-wrapped phase distribution 88 is ⅔ wave). The bottom sections (94 *a-p*) extend radially (with the optical axis representing a radius of zero) in the annular zones between the radial locations at which the phase in the 1.0 wave wrapped phase distribution 82 is the phase given by the calculation "(1.0—the applicable maximum wave value)/2.0" (which for the ⅓ optical wave maximum enhanced phase-wrapped phase distribution 88 is ⅔ wave) and the radial locations at which the phase in the 1.0 wave phase-wrapped phase distribution 82 is 1.0 wave. The phase profiles in the enhanced phase-wrapped phase distribution 88 written in each of the individual areas occupied by the sloped sections (82-*a* through 82-*p*) in the 1.0 wave phase-wrapped phase distribution 82 constitute the individual subsurface optical structures 12 forming the enhanced phase-wrapped phase distribution 88. In the illustrated embodiment, the sloped sections (88 *a-p*), the top sections (90 *a-p*), and the bottom sections (94 *a-p*) are the sections 14 forming the optical structures 12 forming the enhanced phase-wrapped phase distribution 88 (e.g. one of the optical structures 12 in the enhanced phase-wrapped phase distribution 88 is optical structure c, and this structure comprises bottom section 94-*c*, top section 90-*c*, and sloped section 88-*c*). In the illustrated embodiment, the laser-induced refractive index change is positive, but the idea of enhanced phase-wrapped phase distributions can also be applied for cases in which the laser-induced refractive index change is negative. In a material where the laser-induced refractive index change is negative, the top sections of an enhanced phase-wrapped phase distribution will have a phase of 0.0 waves, whereas the bottom sections will have a negative phase (e.g. −0.60 waves).

The ⅓ optical wave maximum enhanced phase-wrapped phase distribution 88 requires less total laser pulse energy to induce in comparison with the ⅓ optical wave maximum scaled phase-wrapped phase distribution 86. The area under the ⅓ optical wave maximum enhanced phase-wrapped phase distribution 88 is about 82 percent of the ⅓ optical wave maximum scaled phase-wrapped phase distribution 86.

Figure 12:
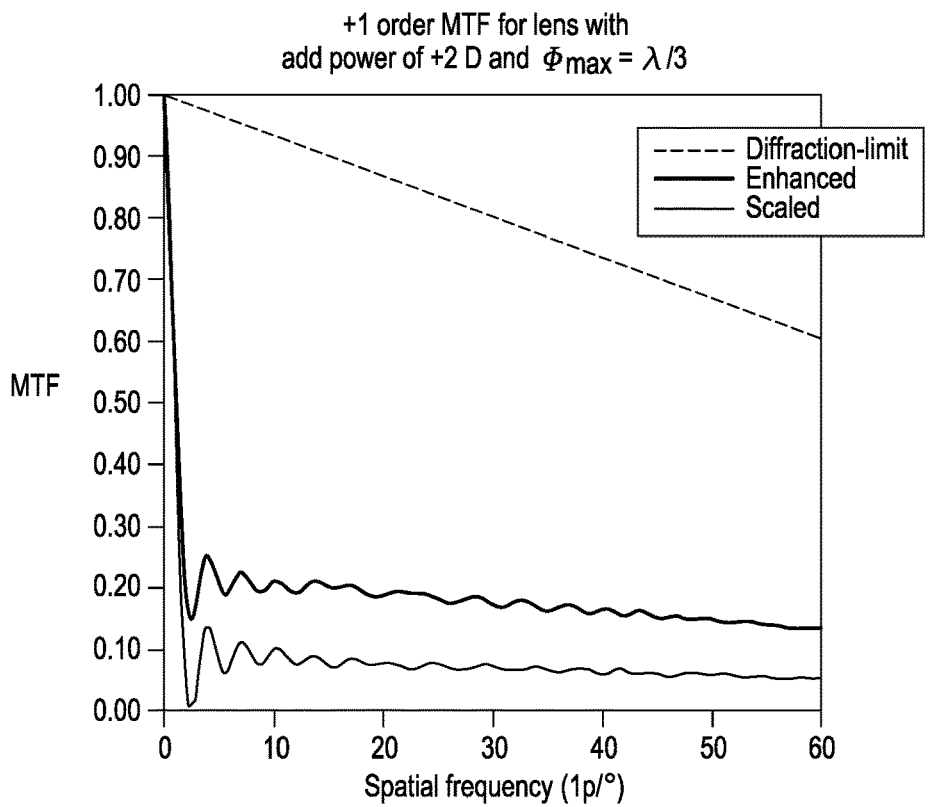
FIG. 12 shows a plot comparing the monochromatic modulation transfer function at best focus for the near focus for the ⅓ optical wave maximum scaled phase-wrapped phase distribution of FIG. 10 and for the ⅓ optical wave maximum enhanced phase-wrapped phase distribution of FIG. 11.

FIG. 12 shows a plot of the monochromatic modulation transfer function (MTF) for near focus 96 calculated for the ⅓ optical wave maximum scaled phase-wrapped phase distribution 86 and a plot of the monochromatic modulation transfer function for near focus 98 calculated for the ⅓ optical wave maximum enhanced phase-wrapped phase distribution 88. MTF is a measure of the ability of an optical system to transfer various levels of contrast from object to image. As shown, the MTF 98 for the ⅓ optical wave maximum enhanced phase-wrapped phase distribution 88 is about double that of the MTF 96 for the ⅓ optical wave maximum scaled phase-wrapped phase distribution 86 for all spatial frequencies between about 2 lp/degree and 60 lp/degree.

Figure 13:
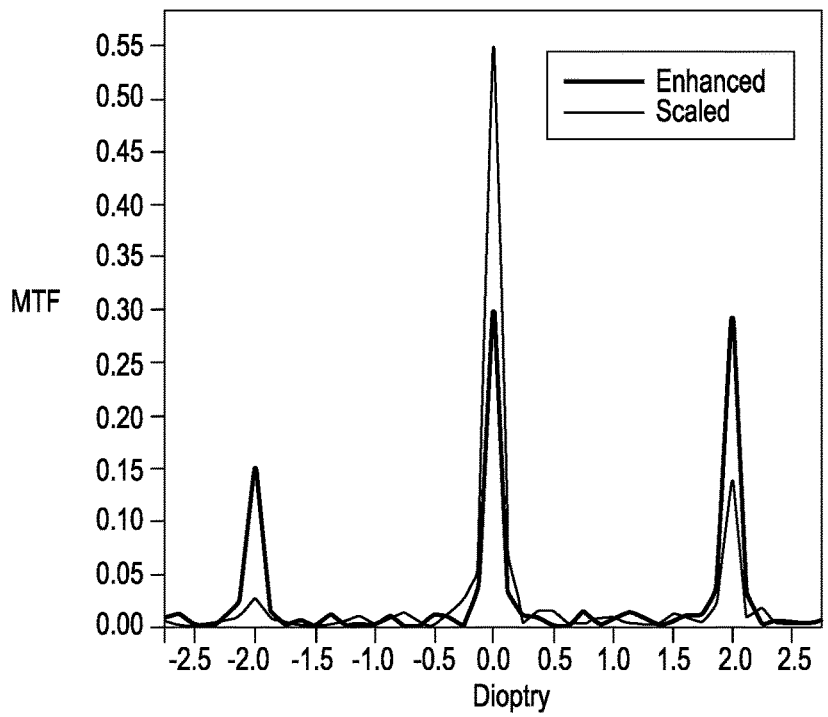
FIG. 13 shows a plot comparing the through-focus monochromatic modulation transfer function at a spatial frequency of 30 lp/° for the ⅓ optical wave maximum scaled phase-wrapped phase distribution of FIG. 10 and for the ⅓ optical wave maximum enhanced phase-wrapped phase distribution of FIG. 11.

FIG. 13 shows a plot of the through-focus MTF 100 (at 30 lp/degree) calculated for the ⅓ optical wave maximum scaled phase-wrapped phase distribution 86 and a plot of the through-focus MTF 102 calculated for the ⅓ optical wave maximum enhanced phase-wrapped phase distribution 88. Through-focus MTF shows how the MTF of an optical system varies as the image acquires defocus (for instance, by having the observed object get farther or closer from the imaging system) for a chosen spatial frequency. As shown, the through-focus MTF 102 for the ⅓ optical wave maximum enhanced phase-wrapped phase distribution 88 is substantially greater than the through-focus MTF 100 for the ⅓ optical wave maximum scaled phase-wrapped phase distribution 86 at 2.0 diopters and −2.0 diopters. While the through-focus MTF 102 is lower than the through-focus MTF 100 at 0.0 diopters, the through-focus MTF 102 does reach a value of 0.30 at 0.0 diopters.

Figure 14:
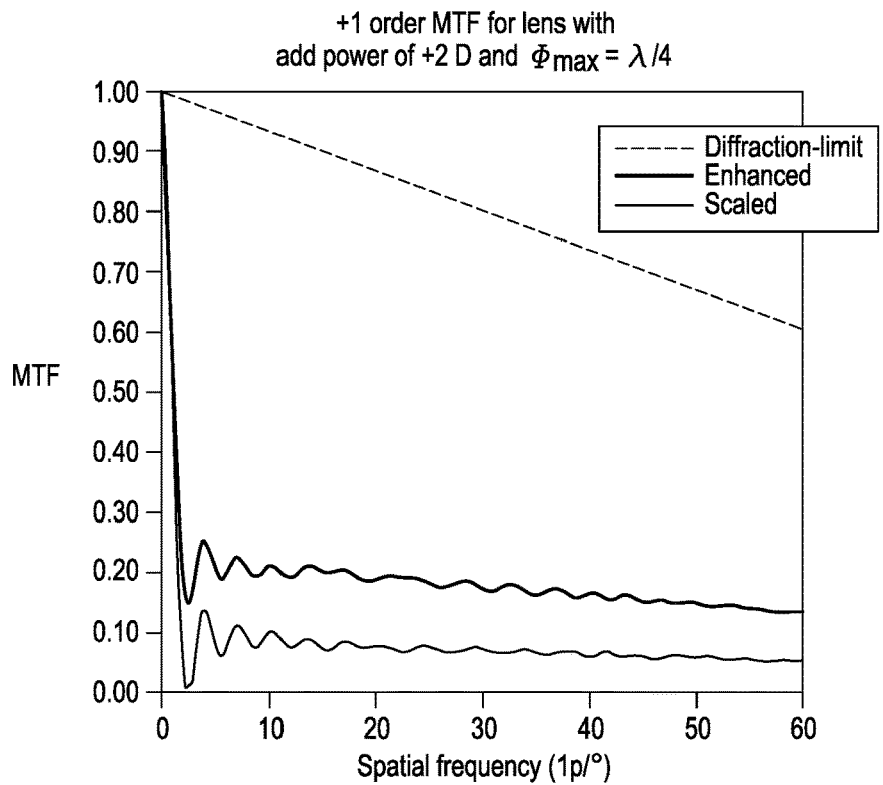
FIG. 14 shows a plot comparing the monochromatic modulation transfer function at best focus for the near focus for the ¼ optical wave maximum scaled phase-wrapped phase distribution corresponding to the 1.0 wave phase-wrapped phase distribution of FIG. 9 and for the ¼ optical wave maximum enhanced phase-wrapped phase distribution corresponding to the 1.0 wave phase-wrapped phase distribution of FIG. 9.

FIG. 14 shows a plot of the monochromatic modulation transfer function for near focus 104 calculated for a ¼ optical wave maximum scaled phase-wrapped phase distribution (similar to the ⅓ optical wave maximum scaled phase-wrapped phase distribution 86 but for a ¼ wave maximum) and a plot of the monochromatic modulation transfer function for near focus 106 calculated for a ¼ optical wave maximum enhanced phase-wrapped phase distribution (similar to the ⅓ optical wave maximum enhanced phase-wrapped phase distribution 88 but for a ¼ wave maximum). As shown, the MTF 106 for the ¼ optical wave maximum enhanced phase-wrapped phase distribution is more than double that of the MTF 104 for the ¼ optical wave maximum scaled phase-wrapped phase distribution for all spatial frequencies between about 2 lp/degree and 60 lp/degree.

Figure 15:
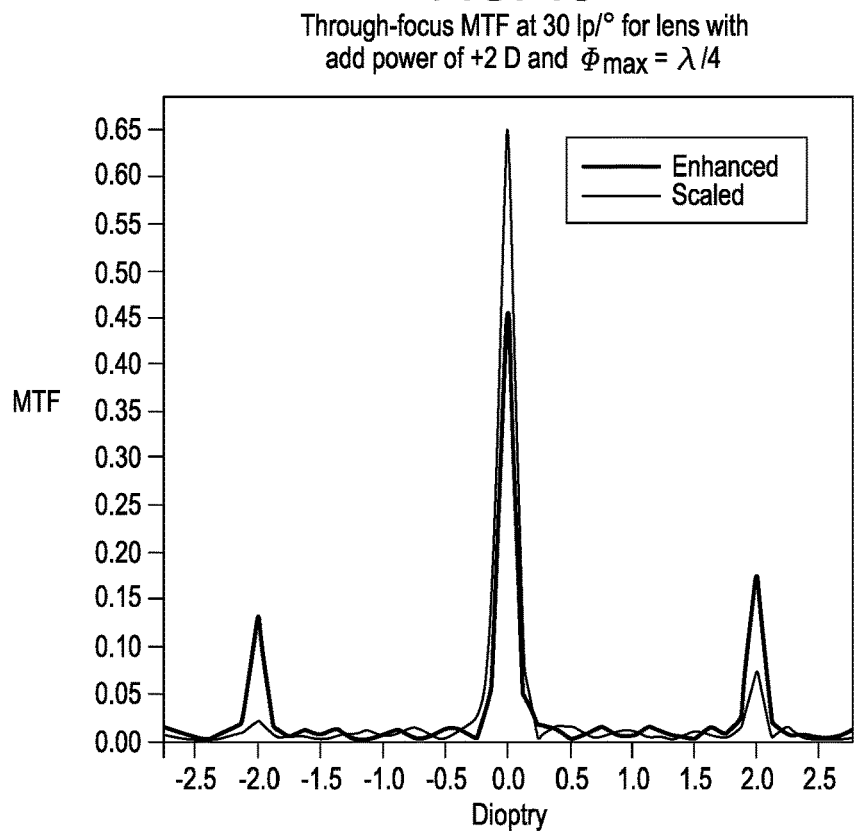
FIG. 15 shows a plot comparing the through-focus monochromatic modulation transfer function at a spatial frequency of 30 lp/° for the ¼ optical wave maximum scaled phase-wrapped phase distribution corresponding to the 1.0 wave phase-wrapped phase distribution of FIG. 9 and for the ¼ optical wave maximum enhanced phase-wrapped phase distribution corresponding to the 1.0 wave phase-wrapped phase distribution of FIG. 9.

FIG. 15 shows a plot of the through-focus MTF 108 (at 30 lp/degree) calculated for the ¼ optical wave maximum scaled phase-wrapped phase distribution and a plot of the through-focus MTF 110 calculated for the ¼ optical wave maximum enhanced phase-wrapped phase distribution. As shown, the through-focus MTF 110 for the ¼ optical wave maximum enhanced phase-wrapped phase distribution is substantially greater than the through-focus MTF 108 for the ¼ optical wave maximum scaled phase-wrapped phase distribution at 2.0 diopters and −2.0 diopters. While the through-focus MTF 110 is lower than the through-focus MTF 108 at 0.0 diopters, the through-focus MTF 110 does reach a value of 0.45 at 0.0 diopters.

Figure 16:
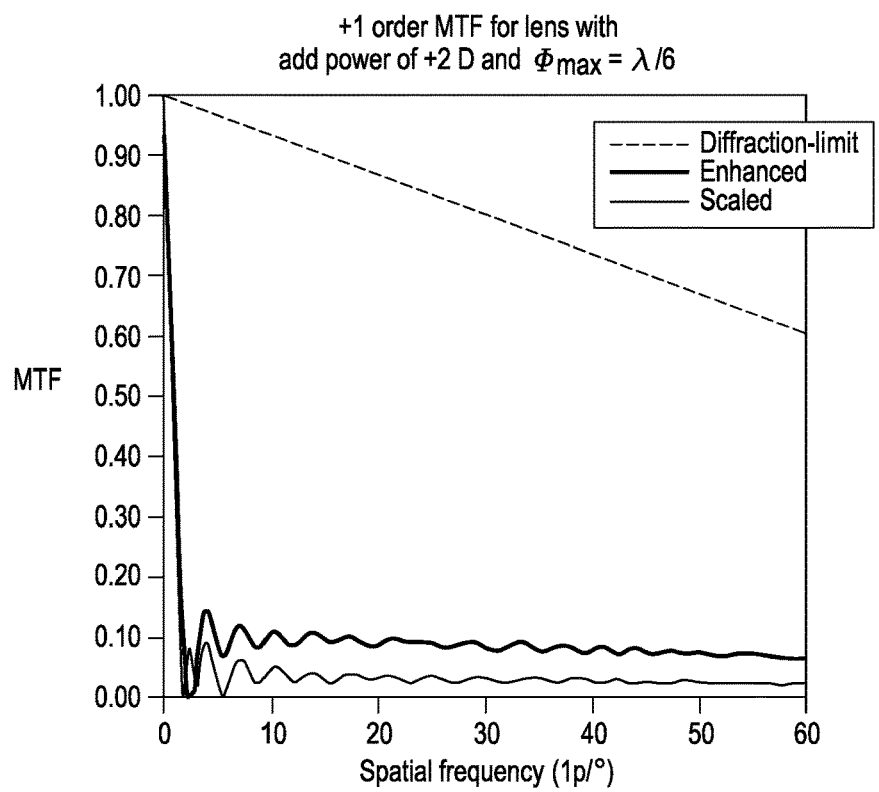
FIG. 16 shows a plot comparing the monochromatic modulation transfer function at best focus for the near focus for the ⅙ optical wave maximum scaled phase-wrapped phase distribution corresponding to the 1.0 wave phase-wrapped phase distribution of FIG. 9 and for the ⅙ optical wave maximum enhanced phase-wrapped phase distribution corresponding to the 1.0 wave phase-wrapped phase distribution of FIG. 9.

FIG. 16 shows a plot of the monochromatic modulation transfer function for near focus 112 calculated for a ⅙ optical wave maximum scaled phase-wrapped phase distribution (similar to the ⅓ optical wave maximum scaled phase-wrapped phase distribution 86 but for a ⅙ wave maximum) and a plot of the monochromatic modulation transfer function for near focus 114 calculated for a ⅙ optical wave maximum enhanced phase-wrapped phase distribution (similar to the ⅓ optical wave maximum enhanced phase-wrapped phase distribution 88 but for a ⅙ wave maximum). As shown, the MTF 114 for the ⅙ optical wave maximum enhanced phase-wrapped phase distribution is more than double that of the MTF 112 for the ⅙ optical wave maximum scaled phase-wrapped phase distribution for all spatial frequencies between about 2 lp/degree and 60 lp/degree.

Figure 17:
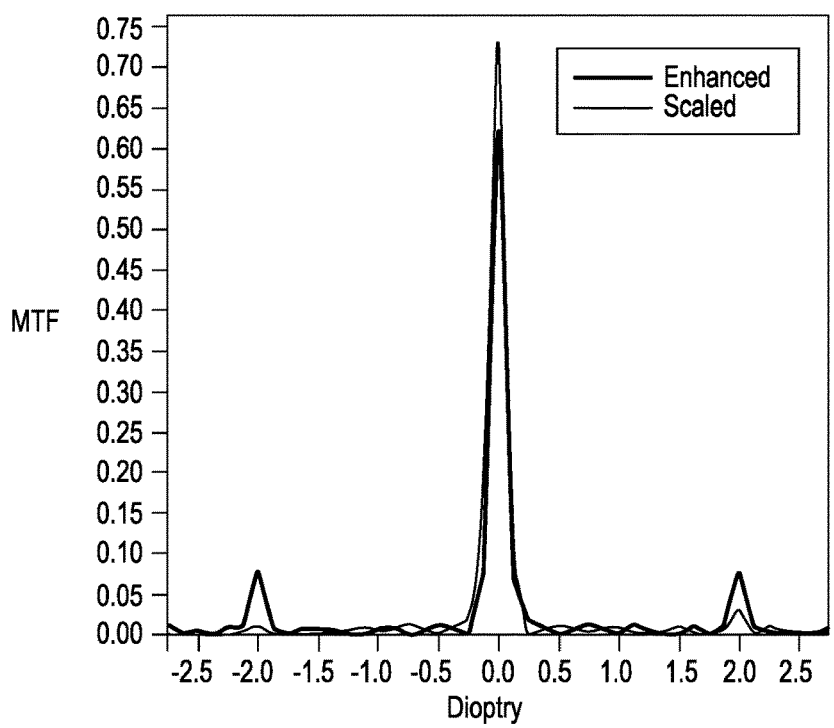
FIG. 17 shows a plot comparing the through-focus monochromatic modulation transfer function at a spatial frequency of 30 lp/° for the ⅙ optical wave maximum scaled phase-wrapped phase distribution corresponding to the 1.0 wave phase-wrapped phase distribution of FIG. 9 and for the ⅙ optical wave maximum enhanced phase-wrapped phase distribution corresponding to the 1.0 wave phase-wrapped phase distribution of FIG. 9.

FIG. 17 shows a plot of the through-focus MTF 116 (at 30 lp/degree) calculated for the ⅙ optical wave maximum scaled phase-wrapped phase distribution and a plot of the through-focus MTF 118 calculated for the ⅙ optical wave maximum enhanced phase-wrapped phase distribution. As shown, the through-focus MTF 118 for the ⅙ optical wave maximum enhanced phase-wrapped phase distribution is substantially greater than the through-focus MTF 116 for the ⅙ optical wave maximum scaled phase-wrapped phase distribution at 2.0 diopters and −2.0 diopters. While the through-focus MTF 118 is lower than the through-focus MTF 116 at 0.0 diopters, the through-focus MTF 118 does reach a value of 0.60 at 0.0 diopters.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An ophthalmic lens comprising:
a lens body made of a transparent material;
a first optical structure disposed within a first volume of the lens body, wherein the first optical structure comprises sub-volumes of the first volume, wherein each of the sub-volumes of the first optical structure has a respective refractive index spatial dependence, wherein refractive indexes of the sub-volumes of the first volume vary spatially between a first limit refractive index for the first optical structure and a second limit refractive index for the first optical structure, wherein the refractive indexes of the sub-volumes of the first volume are equal to the first limit refractive index for the first optical structure over a first section of the first volume, wherein the first section of the first volume spans at least 0.050 mm in length between an inner boundary of the first section of the first volume and an outer boundary of the first section of the first volume, wherein the refractive indexes of the sub-volumes of the first volume are equal to the second limit refractive index for the first optical structure over a second section of the first volume, and wherein the second section of the first volume spans at least 0.050 mm in length between an inner boundary of the second section of the first volume and an outer boundary of the second section of the first volume; and
a second optical structure disposed within a second volume of the lens body, wherein the second optical structure comprises sub-volumes of the second volume, wherein each of the sub-volumes of the second optical structure has a respective refractive index spatial dependence, wherein refractive indexes of the sub-volumes of the second optical structure vary spatially between a first limit refractive index for the second optical structure and a second limit refractive index for the second optical structure, wherein the refractive indexes of the sub-volumes of the second optical structure are equal to the first limit refractive index for the second optical structure over a first section of the second optical structure, wherein the first section of the second optical structure spans at least 0.021 mm in length between an inner boundary of the first section of the second optical structure and an outer boundary of the first section of the second optical structure, wherein the refractive indexes of the sub-volumes of the second optical structure are equal to the second limit refractive index for the second optical structure over a second section of the second optical structure, and wherein the second section of the second optical structure spans at least 0.021 mm in length between an inner boundary of the second section of the second optical structure and an outer boundary of the second section of the second optical structure.

2. The ophthalmic lens of claim 1, wherein:
the lens body has an optical axis; and
the optical axis intersects the second section of the first volume.

3. The ophthalmic lens of claim 1, wherein:
the first limit refractive index for the first optical structure provides a phase change of less than 1.0 waves and greater than 0.10 waves in a visible spectrum from 400 nm to 700 nm; and
the second limit refractive index for the first optical structure provides a phase change of 0.0 waves.

4. The ophthalmic lens of claim 1, wherein:
the first limit refractive index for the first optical structure provides a phase change of greater than −1.0 waves and less than −0.10 waves in a visible spectrum from 400 nm to 700 nm; and
the second limit refractive index for the first optical structure provides a phase change of 0.0 waves.

5. The ophthalmic lens of claim 1, wherein:
the lens body has an optical axis; and
sub-volumes of a third section of the first volume have refractive indexes that vary as a function of coordinates of the sub-volumes of the third section relative to the optical axis.

6. The ophthalmic lens of claim 5, wherein:
the first section of the first volume is disposed between and separates the second section of the first volume and the third section of the first volume; and
the refractive indexes of the sub-volumes of the third section of the first volume vary from the first limit refractive index for the first optical structure to the second limit refractive index for the first optical structure.

7. The ophthalmic lens of claim 1, wherein:
the first limit refractive index for the second optical structure provides a phase change of less than 1.0 waves and greater than 0.10 waves in a visible spectrum from 400 nm to 700 nm; and the second limit refractive index for the second optical structure provides a phase change of 0.0 waves.

8. The ophthalmic lens of claim 1, wherein:

the first limit refractive index for the second optical structure provides a phase change of greater than −1.0 waves and less than −0.10 waves in a visible spectrum from 400 nm to 700 nm; and the second limit refractive index for the second optical structure provides a phase change of 0.0 waves.

9. The ophthalmic lens of claim 1, wherein the second optical structure comprises an inner boundary adjoining an outer boundary of the first optical structure.

10. The ophthalmic lens of claim 1, wherein:

the lens body has an optical axis; and sub-volumes of a third section of the second optical structure have refractive indexes that vary as a function of coordinates of the sub-volumes of the third section relative to the optical axis.

11. The ophthalmic lens of claim 10, wherein:

the first section of the second optical structure is disposed between and separates the second section of the second optical structure and the third section of the second optical structure; and the refractive indexes of the sub-volumes of the third section of the second optical structure vary from the first limit refractive index for the second optical structure to the second limit refractive index for the second optical structure.

12. The ophthalmic lens of claim 1, further comprising:

a third optical structure disposed within a third volume of the lens body, wherein the third optical structure comprises sub-volumes of the third volume, wherein each of the sub-volumes of the third optical structure has a respective refractive index spatial dependence, wherein the refractive indexes of the sub-volumes of the third optical structure vary spatially between a first limit refractive index for the third optical structure and a second limit refractive index for the third optical structure, wherein the refractive indexes of the sub-volumes of the third optical structure are equal to the first limit refractive index for the third optical structure over a first section of the third optical structure, wherein the first section of the third optical structure spans at least 0.016 mm in length between an inner boundary of the first section of the third optical structure and an outer boundary of the first section of the third optical structure, wherein the refractive indexes of the sub-volumes of the third optical structure are equal to the second limit refractive index for the third optical structure over a second section of the third optical structure, and wherein the second section of the third optical structure spans at least 0.016 mm in length between an inner boundary of the second section of the third optical structure and an outer boundary of the second section of the third optical structure.

13. The ophthalmic lens of claim 12, wherein:

the first limit refractive index for the third optical structure provides a phase change of less than 1.0 waves and greater than 0.10 waves in a visible spectrum from 400 nm to 700 nm; and the second limit refractive index for the third optical structure provides a phase change of 0.0 waves.

14. The ophthalmic lens of claim 12, wherein:

the first limit refractive index for the third optical structure provides a phase change of greater than −1.0 waves and less than −0.10 waves in a visible spectrum from 400 nm to 700 nm; and the second limit refractive index for the third optical structure provides a phase change of 0.0 waves.

15. The ophthalmic lens of claim 12, wherein the third optical structure comprises an inner boundary adjoining an outer boundary of the second optical structure.

16. The ophthalmic lens of claim 12, wherein:

the lens body has an optical axis; and sub-volumes of a third section of the third optical structure have refractive indexes that vary as a function of coordinates of the sub-volumes of the third section relative to the optical axis.

17. The ophthalmic lens of claim 16, wherein:

the first section of the third optical structure is disposed between and separates the second section of the third optical structure and the third section of the third optical structure; and the refractive indexes of the sub-volumes of the third section of the second optical structure vary from the first limit refractive index for the third optical structure to the second limit refractive index for the third optical structure.

18. The ophthalmic lens of claim 1, wherein the lens body comprises a contact lens.

19. The ophthalmic lens of claim 1, wherein the lens body comprises an intraocular lens.

* * * * *